(12) United States Patent
Davis et al.

(10) Patent No.: US 8,496,175 B2
(45) Date of Patent: Jul. 30, 2013

(54) SYSTEM AND METHOD FOR IMPROVING SMART CARD READER RECONNECTIONS

(75) Inventors: Dinah Lea Marie Davis, Waterloo (CA); Neil Patrick Adams, Waterloo (CA); Ravi Singh, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/617,363

(22) Filed: Sep. 14, 2012

(65) Prior Publication Data

US 2013/0008946 A1 Jan. 10, 2013

Related U.S. Application Data

(60) Continuation of application No. 13/293,669, filed on Nov. 10, 2011, now Pat. No. 8,292,189, which is a division of application No. 12/163,214, filed on Jun. 27, 2008, now Pat. No. 8,091,785.

(60) Provisional application No. 60/946,590, filed on Jun. 27, 2007.

(51) Int. Cl.
*G06K 7/08* (2006.01)

(52) U.S. Cl.
USPC ......................................................... 235/451

(58) Field of Classification Search
USPC .................. 235/451, 492; 340/10.1–10.6
See application file for complete search history.

(56) References Cited

U.S. PATENT DOCUMENTS

| | | | |
|---|---|---|---|
| 5,378,887 A * | 1/1995 | Kobayashi | 235/492 |
| 5,410,714 A | 4/1995 | Yorimoto et al. | |
| 6,330,653 B1 | 12/2001 | Murray et al. | |
| 7,359,696 B2 * | 4/2008 | Tanaka et al. | 455/411 |
| 7,871,010 B2 | 1/2011 | Adams et al. | |
| 2003/0065698 A1 | 4/2003 | Ford | |
| 2003/0212635 A1 | 11/2003 | Kisliakov | |
| 2004/0039742 A1 | 2/2004 | Barsness et al. | |
| 2006/0034213 A1 | 2/2006 | Munje et al. | |
| 2006/0041746 A1 | 2/2006 | Kirkup et al. | |

(Continued)

FOREIGN PATENT DOCUMENTS

EP 1458137 9/2004

OTHER PUBLICATIONS

Jevtic, Nenad, Second Office Action for CA 2,636,304, Oct. 3, 2012.

(Continued)

*Primary Examiner* — Jamara Franklin
(74) *Attorney, Agent, or Firm* — Integral Intellectual Property Inc.; Miriam Paton

(57) ABSTRACT

Upon recognizing a loss of a first connection to a computing apparatus, such as a personal computer, a smart card reader may maintain an open session with a smart card and may associate an identity of the computing apparatus of the first connection with the open session. Some time later, the smart card reader may establish a second connection with a computing apparatus. The smart card reader may compare an identity of the computing apparatus of the second connection with the identity of the computing apparatus of the first connection. Responsive to determining that the identities do not match, the smart card reader may close the open session with the smart card. Responsive to determining that the identities do match, the smart card reader may maintain the open session with the smart card.

21 Claims, 13 Drawing Sheets

U.S. PATENT DOCUMENTS

| | | |
|---|---|---|
| 2007/0115126 A1* | 5/2007 | Harkins ............ 340/572.1 |
| 2007/0130573 A1 | 6/2007 | Farquhar |
| 2008/0011851 A1 | 1/2008 | Adams et al. |
| 2010/0019887 A1 | 1/2010 | Bridgelall et al. |
| 2012/0032788 A1 | 2/2012 | Gravelle et al. |

OTHER PUBLICATIONS

Sylvain, Alliot, Extended European Search Report for EP 08159269, Apr. 22, 2009.

* cited by examiner

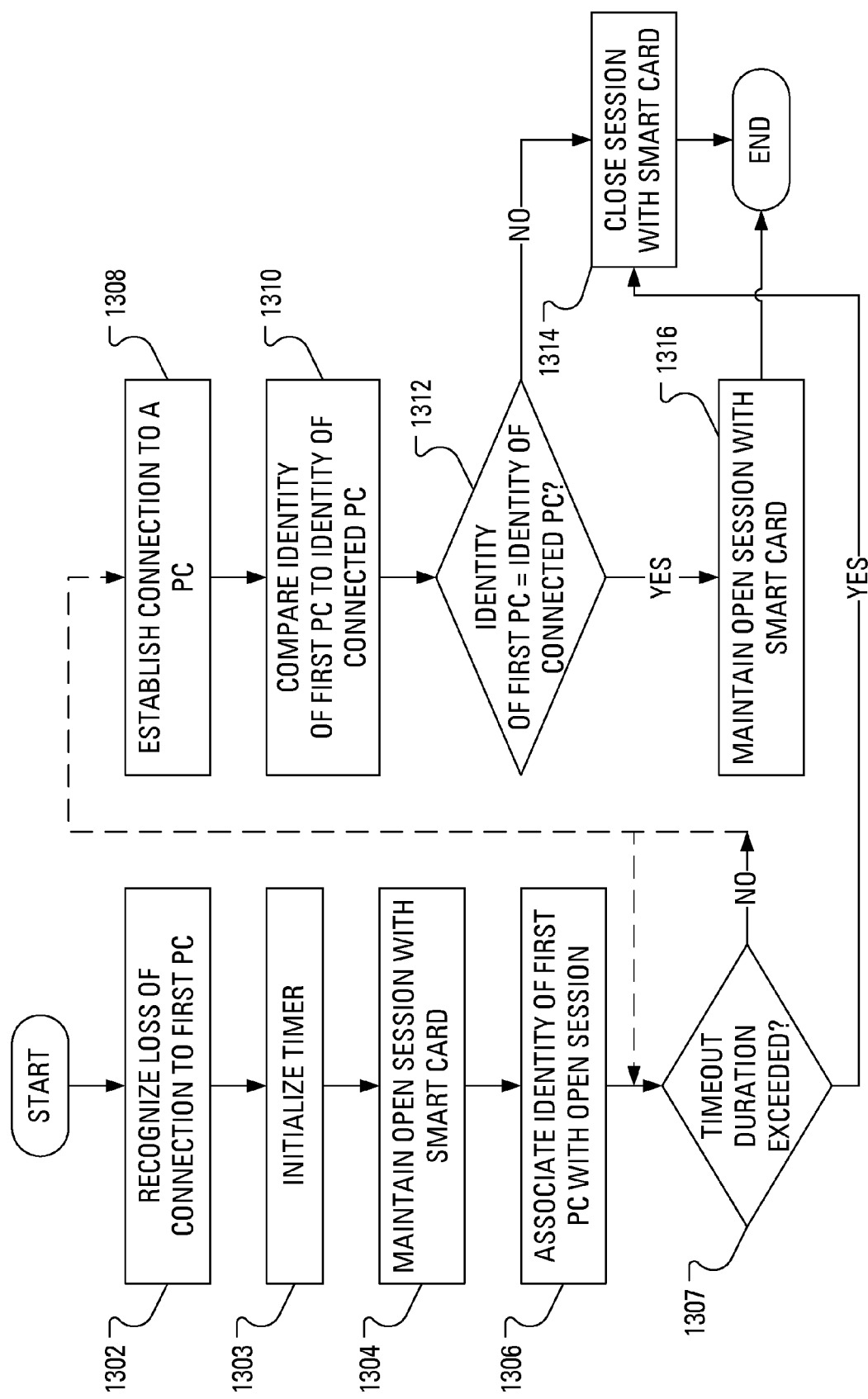

US 8,496,175 B2

SYSTEM AND METHOD FOR IMPROVING SMART CARD READER RECONNECTIONS

RELATED APPLICATION DATA

This application is a continuation of U.S. patent application Ser. No. 13/293,669, filed Nov. 10, 2011, which in turn is a divisional of U.S. patent application Ser. No. 12/163,214, filed Jun. 27, 2008, which issued on Jan. 10, 2012 as U.S. Pat. No. 8,091,785, which in turn claims priority from U.S. Provisional Patent Application No. 60/946,590, filed Jun. 27, 2007, the contents of which are herein incorporated by reference in their entirety.

FIELD

The present application relates generally to smart card readers and, in particular, to a system and method of improving smart card reader reconnections.

BACKGROUND

Smart card readers are used in a variety of applications, for example, in combination with handheld devices and personal computers for security related purposes.

Some operating systems (such as Microsoft® Windows®) installed in personal computers include a generic or multipurpose smart card resource manager. Third party vendors may also provide their own smart card readers, which may thus require their own smart card reader drivers to be installed for use with the operating system. In such instances, the smart card resource manager may communicate with the vendor-specific smart card reader driver ahead of accessing or communicating with the smart card reader.

Improved efficiencies in communications among smart card resource managers, smart card reader drivers and smart card readers are desirable.

BRIEF DESCRIPTION OF THE DRAWINGS

Reference will now be made to the drawings, which show by way of example, embodiments of the invention, and in which:

FIG. 13 shows a flow diagram of an example method executed by a smart card reader after the loss of a connection between the personal computer and the smart card reader in accordance with one embodiment.

DETAILED DESCRIPTION

Figure 1:
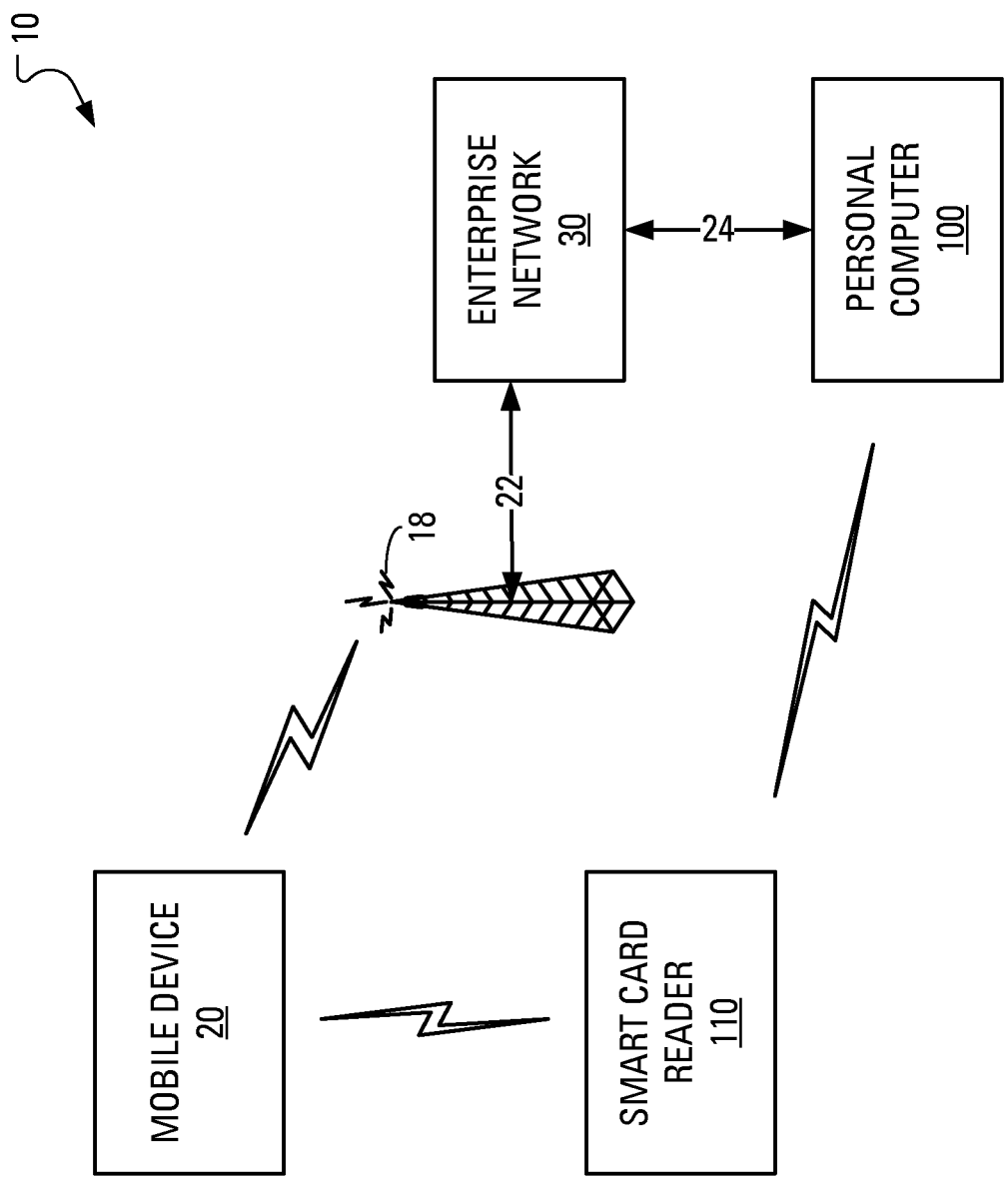
FIG. 1 shows in block diagram form a communication system suitable for a smart card reader and personal computer in accordance with one embodiment.

Communications between a computing device and a smart card reader having an associated smart card are facilitated through the use, by the computing device, of a smart card resource manager and a smart card reader service and through the appropriate configuration of the smart card reader. The smart card reader service acts as a relay for commands between the smart card resource manager and the smart card reader. The smart card reader service may be of particular use when a connection between the computing device and the smart card reader is wireless. Appropriate configuration of the smart card reader service obviates a redundant downloading of certificates from smart card to computing device subsequent to loss, and reestablishment, of a connection between the computing device and the smart card reader.

According to one aspect described herein, there is provided, at a computing device, a method of facilitating communications between the computing device and a smart card reader, the smart card reader configured for communication with a smart card, the computing device including a smart card resource manager. The method includes re-establishing a connection between the smart card reader and the computing device subsequent to a loss of connection, determining, from the smart card reader, a status of the smart card, if the status of the smart card is determined to be present with the smart card reader, determining, from the smart card reader, that a communication link between said smart card and said smart card reader has been ended and reestablished during the loss of the connection, indicating, to the smart card resource manager, a smart card absent status and indicating, to the smart card resource manager, a smart card present status. In other aspects of the present application, an apparatus is provided for carrying out this method and a computer readable medium is provided for adapting a processor to carry out this method.

According to another aspect described herein, there is provided, at a smart card reader, a method of responding to a loss of connection with a first computing apparatus. The method includes maintaining an open session with an associated smart card, associating an identity of the first computing apparatus with the open session, establishing a connection with a second computing apparatus and closing the open session in response to determining that an identity of the second computing apparatus does not match the identity of the first computing apparatus associated with the open session. In other aspects of the present application, a smart card reader is provided for carrying out this method and a computer readable medium is provided for adapting a processor in a smart card reader to carry out this method.

As suggested above, some operating systems (such as Microsoft® Windows®) installed in personal computers include a generic or multipurpose smart card resource manager. Third party vendors may also provide their own smart card readers, which may thus require their own smart card reader drivers to be installed for use with the operating system. In such instances, the smart card resource manager may communicate with the vendor-specific smart card reader driver first in order to access or communicate with the smart card reader. In other words, the vendor-supplied smart card reader driver would merely act as a flow-through or relay of any instructions from the smart card resource manager to the smart card reader. A difficulty with such systems is that many commands from the smart card resource manager may be redundant or unnecessary, and relaying such commands to the smart card reader may be an inefficient use of time and computational resources. Thus, more efficient management of communications between a generic smart card resource manager and a smart card reader is desired.

Reference is first made to FIG. 1, which shows an illustrative communication system 10 to which embodiments described herein can be applied. The system 10 includes one or more mobile devices 20 (only one of which is shown in FIG. 1) that are enabled to communicate with one or more wireless networks 18 (only one of which is shown in FIG. 1). The wireless network 18 may be implemented as a packet-based cellular wide area wireless network that includes a number of base stations each providing wireless Radio Frequency (RF) coverage to a corresponding area or cell. In some embodiments, instead of, or in addition to, a wide area wireless network, the wireless network 18 may include a local wireless area network, such as for example a wireless local area network that conforms to Institute of Electrical and Electronics Engineers (IEEE) 802.11 standards such as 802.11b and/or 802.11g. In at least some example embodiments, the wireless network 18 is connected to one or more enterprise networks 30 (only one of which is shown in FIG. 1). The connection between the wireless network 18 and the enterprise network 30 may involve an intermediate communications link 22, which may pass through additional networks including, for example, the Internet. The enterprise network 30 may be associated with a mobile device 20, such that the mobile device 20 is enabled to exchange electronic messages and other information with the enterprise network 30. The mobile device 20 may have an associated secondary mobile device in the form of a smart card reader 110. Additionally, a user of the mobile device 20 and the smart card reader 110 may have access to a personal computer 100 that is connected to the enterprise network 30 over a communications link 24. In one embodiment, the communications link 24 is a local area network or wide area network providing organizational connectivity with the enterprise network 30. The smart card reader 110 may also be used with the personal computer 100, through either a wired or wireless connection.

Figure 2:
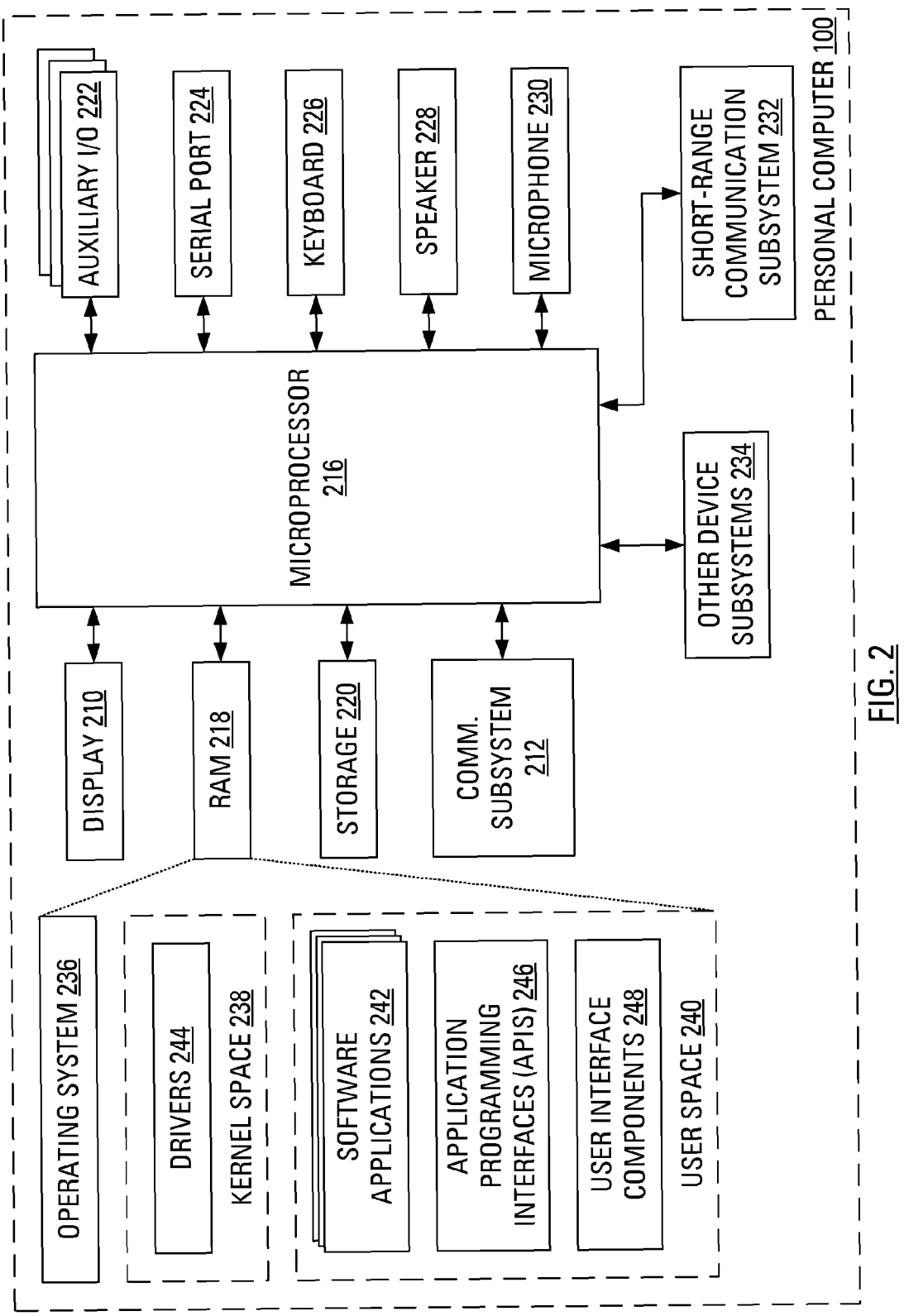
FIG. 2 shows an operational block representation of a personal computing device according to one embodiment.

Reference is next made to FIG. 2, which shows, in greater detail, an embodiment of the personal computer 100. The personal computer 100 includes a display sub-system 210 and a network communication subsystem 212 for two-way communications with the enterprise network 30 (FIG. 1). According to one embodiment, the communications subsystem 212 may include a wireless communications subsystem including antennas (not shown), RF transceivers (not shown), and some signal processing capabilities, implemented, for example, by a digital signal processor (not shown). According to another embodiment, the communications subsystem 212 may include a wired communications subsystem conforming to the well known Ethernet standard, including a 10 Mbps, 100 Mbps, or 1 Gbps Ethernet connection. The personal computer 100 also includes a controller in the form of at least one microprocessor 216 which is suitably programmed to control the overall operation and functions of the personal computer 100, which overall operation and functions are described in more detail below. The personal computer 100 includes peripheral devices or subsystems such as a random access memory (RAM) 218, a storage device 220, such as a hard disk drive, an auxiliary input/output (I/O) subsystem 222 (e.g., a mouse), a serial port 224 (e.g., a USB port), an input device 226 (e.g., a keyboard), a speaker 228, a microphone 230, a short-range communications subsystem 232 (e.g., an infrared transceiver, wireless bus protocol such as a Bluetooth™ system, or any other means of local wireless communications), and any other device subsystems generally designated by reference 234.

The microprocessor 216 operates under stored program control with code being stored in the storage device 220. As depicted in FIG. 2, while operational, the RAM 218 includes programs including an operating system program or code module 236, such as the Microsoft® Windows® operating system. Operating systems such as Windows typically divide the RAM space 218 into two portions, namely a restricted access space such as a kernel space 238 and a user space 240, or functional equivalents thereof. The RAM 218 further includes software applications indicated generally by reference 242, which typically reside in the user space 240, and drivers 244, which typically reside in the kernel space 238. The user space 240 can further include various application programming interfaces (APIs) 246 and various user interface (UI) components 248. The UI components 248 are the existing functions or routines provided by the operating system 236 that may be called by programs such as the software applications 242 in order to display elements of the graphical user interface to the user of the personal computer 100.

The operating system code 236, code for specific software applications 242, code for the drivers 244, code for the various application programming interfaces (APIs) 246 or code for the various user interface (UI) components 248 is permanently or semi-permanently stored on the storage device 220 and may be temporarily loaded into a volatile storage medium such as the RAM 218 during operation of the personal computer 100. Received communication signals and other data with information may also be stored in the RAM 218. Code for the specific device applications 242 or other elements of the user space 240 may be swapped back out to the storage device 220 as needed during operation of the personal computer 100, while code related to the kernel space 238, such as many aspects of the operating system code 236 and/or the drivers 244, is typically loaded into the RAM 218 upon boot-up of the personal computer 100 and is retained in the RAM 218 as long as the personal computer 100 remains powered up.

The stored program control (e.g., operating system 326, software applications 242) for the microprocessor 216 also includes a predetermined set of applications or code components or software modules that control basic device operations, for example, data and text communication applications which are normally installed on the personal computer 100 as the software applications 242 when the personal computer 100 is first configured. Further applications may also be loaded (i.e., downloaded) onto the personal computer 100 through the operation of: the networks described above for FIG. 1; the auxiliary I/O subsystem 222; the serial port 224; or the short-range communications subsystem 232. The downloaded code module or components are then installed by the user (or automatically) in the RAM 218 or the storage device 220.

The serial port 224 may comprise a USB-type interface port for interfacing or synchronizing with another device, such as the mobile device 20 or the smart card reader 110. In one embodiment, the serial port 224 may be used to communicate with the smart card reader 110. The short-range communications subsystem 232 provides an interface for communication between the personal computer 100 and other devices, including the smart card reader 110, to be described in greater detail in connection with FIG. 3, below. For example, the short-range communications subsystem 232 may comprise an infrared communication link or channel, a wireless bus protocol, such as a Bluetooth™ communications subsystem, or any other localized wireless means of communication.

Figure 3:
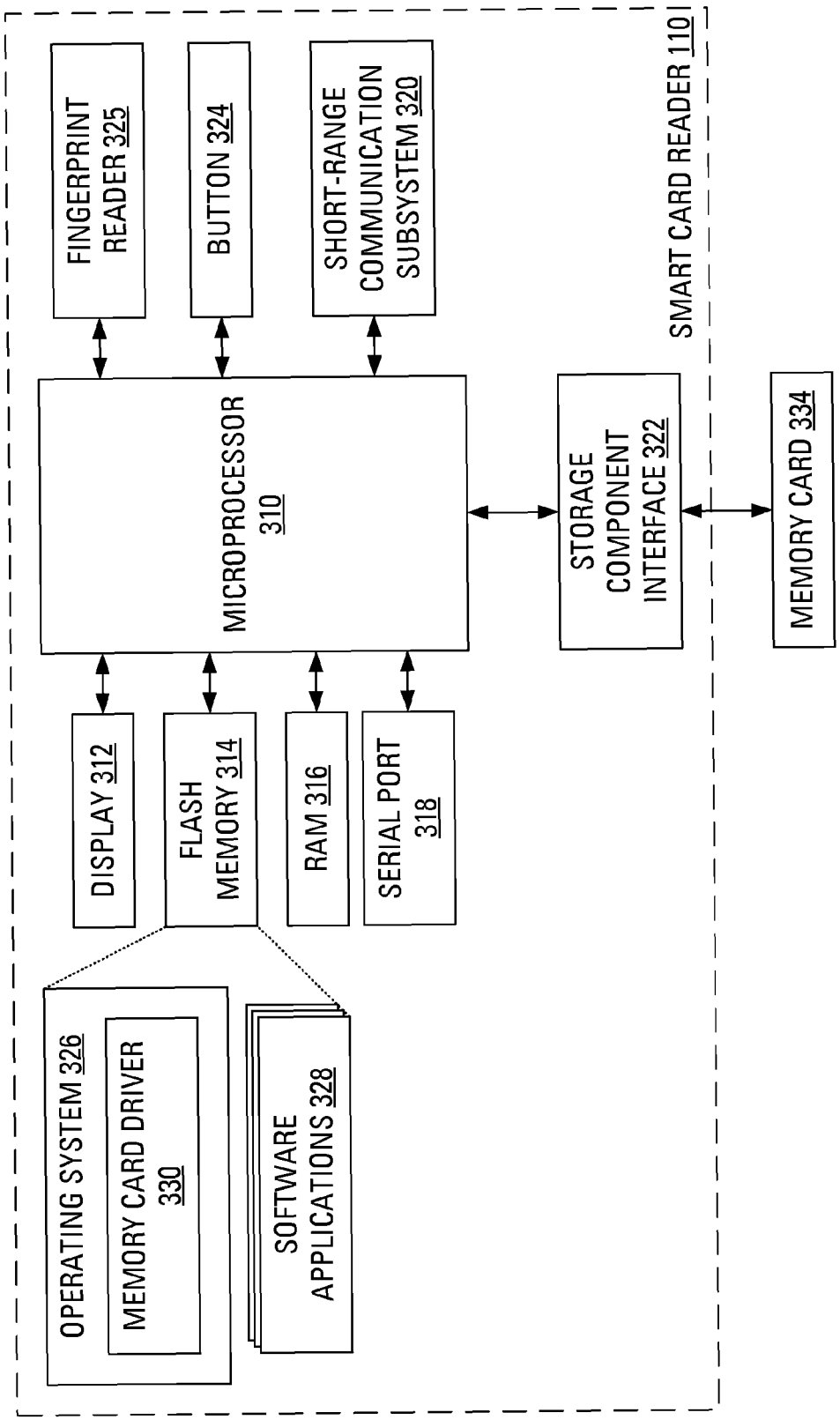
FIG. 3 shows an operational block representation of an embodiment of a smart card reader for use with the personal computing device shown in FIG. 2.

Reference is next made to FIG. 3, which shows, in greater detail, an example embodiment of a secondary mobile device, namely the smart card reader 110. The smart card reader 110 includes a controller including at least one microprocessor 310, which is suitably programmed to control the overall operation and functions of the smart card reader 110, and an output device (e.g., a display module 312). The smart card reader 110 further includes peripheral devices or subsystems such as a flash memory 314, a random access memory (RAM) 316, a serial port 318 (e.g., a USB port), a short-range communications subsystem 320 (e.g., an infrared transceiver, wireless bus protocol such as a Bluetooth system or any other means of local communications), a storage component interface 322 (e.g., for a memory card or any other data storage device), a user input device 324 (e.g., a push button), and a biometric input device 325 (e.g., a fingerprint reader).

The microprocessor 310 operates under stored program control with code or firmware being stored in the flash memory 314 (or other type of non-volatile memory device or devices). As depicted in FIG. 3, the stored programs include an operating system program or code module 326 and other programs or software applications indicated generally by reference 328. The operating system 326 of the smart card reader 110 further includes a memory card driver component 330. The memory card driver 330 is responsible for coordinating communications between the smart card reader 110 and a memory card 334 and/or between the smart card reader 110 and related drivers of a device to be used in conjunction with the smart card reader 110, such as the drivers 244 of the personal computer 100. The operating system code 326, code for specific software applications 328, code for the memory card driver 330, or code components thereof, may be temporarily loaded into a volatile storage medium such as the RAM 316. Received communication signals and other data with information may also be stored in the RAM 316. Additionally, the storage component interface 322 receives the removable memory card 334, providing additional storage space for the smart card reader 110. In one embodiment, the memory card 334 may be a smart card similar to the smart cards known to those skilled in the art. The memory card 334 may include fingerprint authentication data, password or pin code related data, or other security related data. While operation of the smart card reader 110 is described using a smart card, it will be understood by those skilled in the art that the smart card reader 110 may be designed using any suitable form of removable media without departing from the intended scope of the smart card reader 110.

The stored program control (e.g., operating system 326, software applications 328) for the microprocessor 310 also includes a predetermined set of applications or code components or software modules that control basic device operations, for example, management and security related control of the data of the smart card reader 110 and may be installed on the smart card reader 110 as a component of the software applications 328 during the manufacturing process. Further applications may also be loaded (i.e., downloaded) onto the smart card reader 110 through the operation of the serial port 318, the operation of the short-range communications subsystem 320 or from the smart card 334. The downloaded code module or components are then installed by the user (or automatically) in the non-volatile program memory (e.g., the flash memory 314) or the RAM 316.

The serial port 318 may comprise a USB-type interface port for interfacing or synchronizing with another device, such as the personal computer 100 (FIG. 2) or the mobile device 20 (FIG. 1). The serial port 318 is used to exchange data with a device such as the personal computer 100 to be stored on the smart card 334 that is plugged into the storage component interface 322 of the smart card reader 110. The serial port 318 is also used to extend the capabilities of the smart card reader 110 by providing for information or software downloads, including any user interface information, to the smart card reader 110.

In various example embodiments, the short-range communications subsystem 320 provides an interface for communication between the smart card reader 110 and the personal computer 100 or the mobile device 20. In one embodiment, the short-range communications subsystem 320 includes an infrared communication link or channel. In another embodiment, the subsystem 320 comprises a wireless RF bus protocol such as a Bluetooth™ communications subsystem. However, the short-range communications subsystem 320 may comprise any suitable local wireless means of communication, so long as the short range communications subsystem 232 of the personal computer 100 (FIG. 2) is chosen to operate using the same protocol, which may for example facilitate wireless communication between the personal computer 100 and the smart card reader 110. Any suitable communications mechanism and/or protocol may be implemented for the short range communications subsystems 320 and 232.

In order for the personal computer 100 to be able to properly communicate with the smart card reader 110, a suitable driver (hereinafter referred to as a smart card reader driver) can be loaded onto the personal computer 100 (e.g., as one of the drivers 244). For example, an operating system 236 such as Microsoft® Windows® may be applied to or loaded onto the personal computer 100 and may include its own system supplied smart card reader driver.

Figure 4:
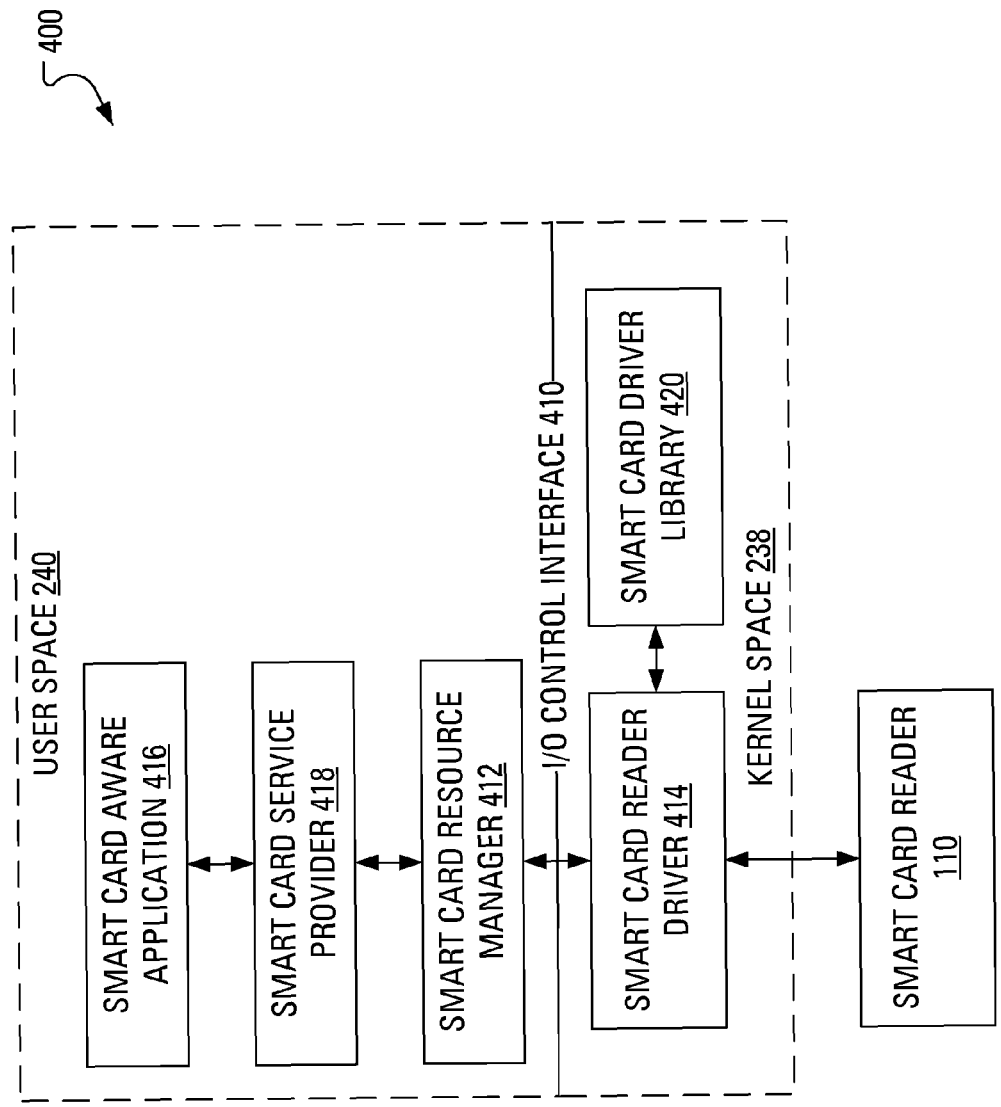
FIG. 4 shows in diagrammatic form a Microsoft® Windows® smart card environment.

Referring to FIG. 4, a diagram is shown illustrating a Microsoft® Windows® smart card environment 400, for example, as described by the Windows Driver Development Kit (DDK). For purposes of facilitating an understanding of example embodiments of the invention that are described further below, a brief description will now be provided of the different components of the Microsoft® Windows® smart card environment 400, for communications with a smart card reader through a wired connection such as a Universal Serial Bus (USB) interface. The kernel space 238 and the user space 240 are indicated as shown in FIG. 4, with the interface between the kernel space 238 and the user space 240 referred to as an I/O control interface 410. Applications communicate with a smart card reader driver 414 by means of a smart card resource manager 412. In one example embodiment, the smart card reader driver 414 is a vendor-supplied smart card reader driver supplied by the vendor of smart card reader 110 and resides in the kernel space 238. In some embodiments, the smart card reader driver 414 may be provided by the source of the operating system 236 (e.g., Microsoft®), rather than the vendor of the smart card reader 110. The smart card resource manager 412 resides in the user space 240. As shown, the smart card reader driver 414 communicates with the smart card reader 110. The resource manager 412 communicates with the smart card reader driver 414 by means of an I/O control function (i.e., the IOCTL( ) function) across the I/O control interface 410. The I/O control functions are dispatched using a DeviceIoControl system call. A smart card aware application 416 may send instructions to the smart card reader driver 414 by means of the system call DeviceIoControl, and the operating system forwards the indicated I/O control function to the smart card reader driver 414. I/O control functions initiated by the smart card aware applications 416 are passed to a smart card service provider 418. The smart card service provider 418 passes the function to the smart card resource manager 412. The smart card resource manager 412 manages the resources related to the smart card reader 110 and may communicate with the smart card reader driver 414. The operating system forwards the request by means of an I/O request packet (IRP).

In some example embodiments, the smart card reader driver 414 is designed to work with the resource manager 412 and a smart card driver library 420 supplied with operating system 236. Thus, the smart card reader driver 414 may use the smart card driver library 420 to perform many of its key operations.

Figure 5:
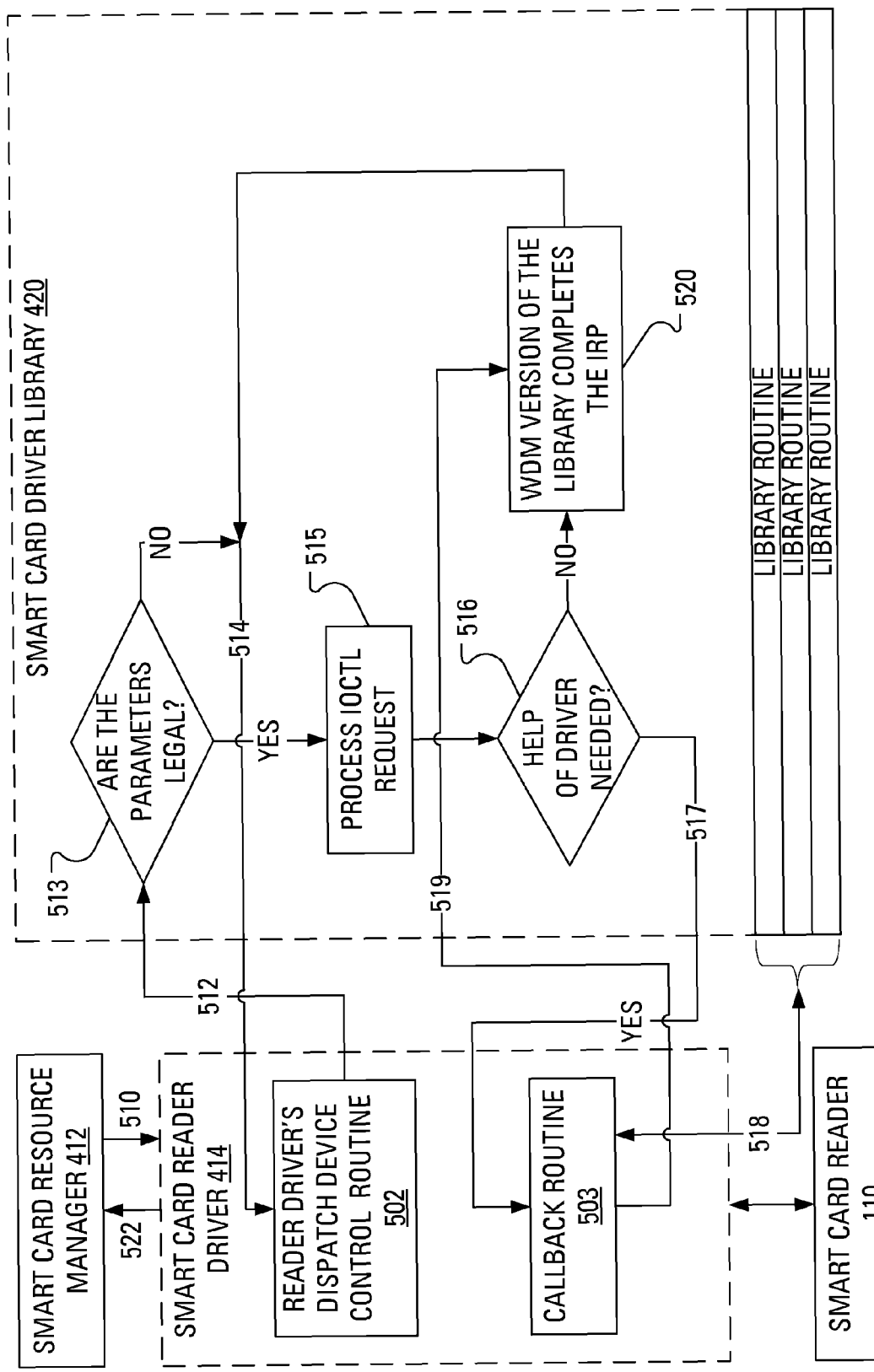
FIG. 5 shows in diagrammatic form the interaction between the smart card reader driver and the windows smart card driver library in the smart card reader environment as shown in FIG. 4.

FIG. 5 illustrates generally an interaction between the smart card reader driver 414 and the windows smart card driver library 420, for example, as described by the DDK. With reference to FIG. 5, the steps that the reader driver 414 must take together with the supplied driver library 420 to process an I/O control request (IOCTL( )) are described. As indicated by reference 510, the smart card reader driver 414 receives an IOCTL( ) call from the smart card resource manager 412. The smart card reader driver 414, more particularly, a reader driver dispatch device control routine 502, passes an IOCTL control request to a SmartCardDeviceControl driver library routine in the smart card driver library 420 (e.g., a Windows Driver Model (WDM) based driver), as indicated by reference 512. The SmartCardDeviceControl driver library routine determines (step 513) whether the parameters received from the smart card reader driver 414 are correct. Where the parameters are determined to be incorrect, the SmartCardDeviceControl driver library routine returns with an error message, as indicated by reference 514. In the WDM version of the driver library 420, SmartCardDeviceControl driver library routine returns without completing the IRP if the parameters are incorrect. Typically, the parameters in the IRP are intended for a specific smart card action. The IRP is a structure for parameters associated with the specific action to be passed back and forth between the smart card resource manager 412, the smart card reader driver 414 and the smart card driver library 420. In the event that the parameters are incorrect, a status value inside the IRP indicates to the smart card resource manager 412 that the intended smart card action was not successfully completed.

If the parameters are determined to be correct, the SmartCardDeviceControl driver library routine processes the IOCTL request if it can (step 515). The SmartCardDeviceControl driver library routine then determines (step 516) whether the smart card reader driver 414 has a callback routine defined for the IOCTL( ) request that it is processing. If a callback routine 503 exists, the SmartCardDeviceControl driver library routine (step 516) calls the callback routine 503, as indicated by reference 517. The callback routine 503 then calls all the driver library routines that are required to complete the processing of the IOCTL, as indicated by reference 518. After processing the IOCTL( ) function, the callback routine 503 returns control to the SmartCardDeviceControl driver library routine, as indicated by reference 519. In the WDM version of the library, SmartCardDeviceControl completes (step 520) the IRP that carried the IOCTL( ). The SmartCardDeviceControl driver library routine then returns control to the reader driver dispatch device control routine 502, as indicated by reference 514. The smart card reader driver 414 then returns the IOCTL( ) call to the smart card resource manager 412, as indicated by reference 522.

The smart card library driver 420 synchronizes access to the smart card reader driver 414 so that no two callback functions are called at the same time. However, card insertion and removal event handling (e.g., when the smart card reader 110 indicates that the smart card 334 is either inserted into or removed from the storage interface 322, shown in FIG. 3) may be processed asynchronously.

Figure 6:
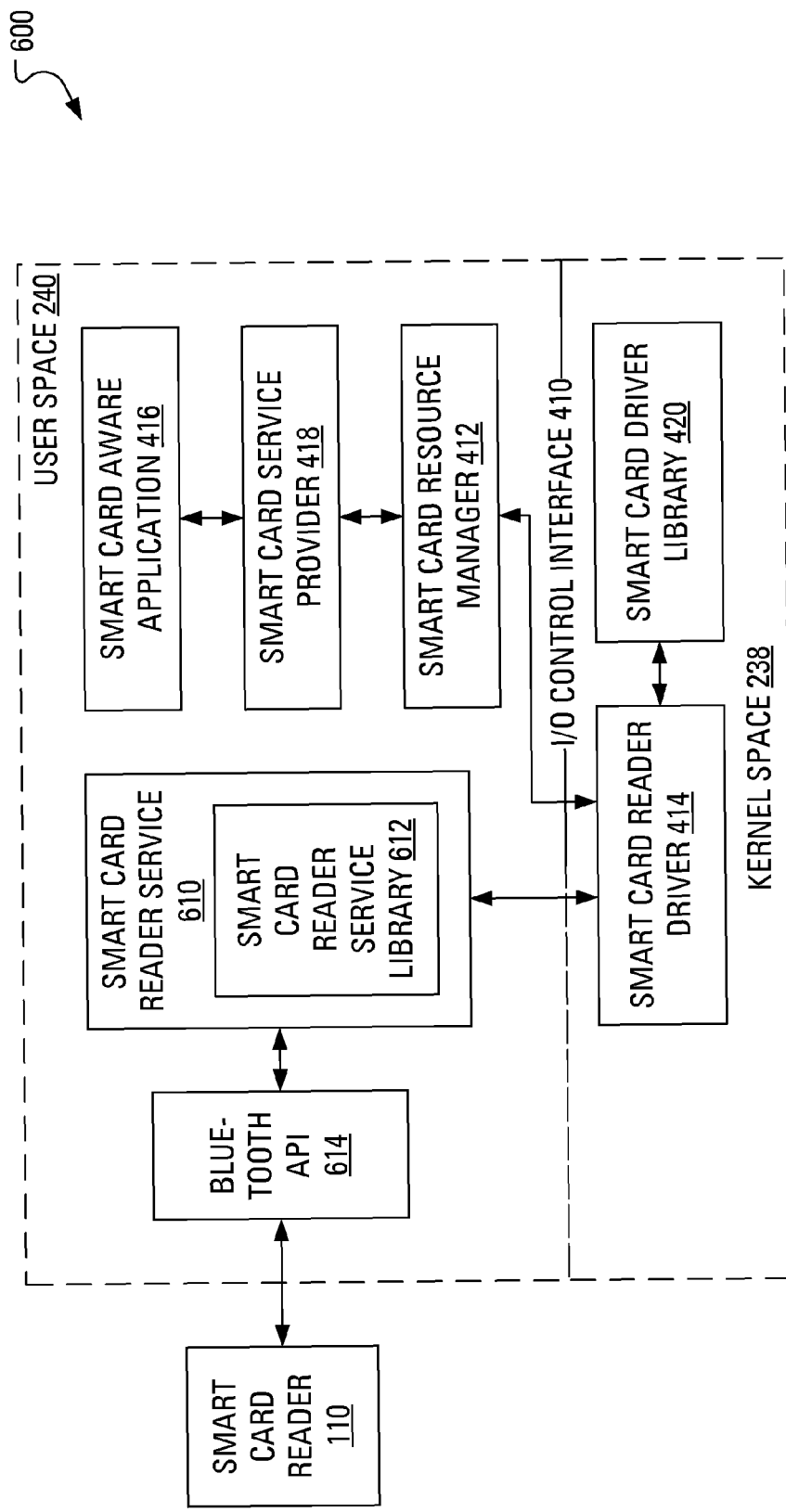
FIG. 6 shows in diagrammatic form a smart card reader environment.

Referring now to FIG. 6, another smart card reader environment 600 is illustrated in accordance with example embodiments of the invention. The smart card reader environment 600 is similar to the Microsoft® Windows® smart card environment 400 of FIG. 4, described above, except that, in the smart card reader environment 600 of FIG. 6, a wireless air interface exists between the smart card reader 110 and the personal computer 100, rather than a wired USB interface as shown in FIG. 4. As indicated above, user applications (e.g., Microsoft® Outlook® or Microsoft® Word) typically reside in the user space 240 and drivers (including the smart card reader driver 414) reside in the kernel space 238. In at least some example embodiments, placing a driver, such as the smart card reader driver 414, in the kernel space 238, as required by Microsoft® Windows®, can raise two possible issues: (a) the user interface components 248 cannot be directly accessed and/or displayed by code residing in the kernel space 238; and (b) a Bluetooth API, which is installed as one of the APIs 246 and is used to access a Bluetooth communications port (i.e., as a component of the short range communications subsystem 232), cannot be directly accessed from the kernel space 238. Since Bluetooth communications between the personal computer 100 and the smart card reader 110 would have to occur via the Bluetooth API, the Bluetooth API must be accessible to a smart card reader driver to be installed on the personal computer 100. The smart card reader driver 414 to be used on the personal computer 100 also needs access to the UI components 248 so that a user of the personal computer 100 can input Bluetooth secure pairing keys using the UI components 248, as well as other information.

To address the above issues, the example embodiment shown in the smart card reader environment 600 of FIG. 6 includes a user space 240 application, referred to as a smart card reader service (SCRS) 610. The SCRS 610 is placed in the user space 240 and therefore has access to a Bluetooth API 614, as the APIs 246 also reside in the user space 240. Therefore, using the Bluetooth API 614, the SCRS 610 is capable of opening a Bluetooth communication port. The SCRS 610 takes messages from the Smart Card Reader Driver 414 and sends the messages to the smart card reader 110 through the Bluetooth communication port (e.g., using the short range communications subsystems 232 and 320). Since the SCRS 610 resides in the user space 240, the SCRS can make display calls to the user interface at any time, using the user interface components 248.

In the Microsoft® Windows® smart card environment 400 of FIG. 4, in which a wired interface (e.g., a USB connection) exists between the personal computer 100 and the smart card reader 110, messages or data destined for the smart card reader 110 are passed from the smart card reader driver 414 through the driver stack to the USB or serial driver, since all the drivers 244 are located in the kernel space 238. The USB or serial driver then sends these messages to the smart card reader 110 over the serial connection. Turning back again to the smart card reader environment 600 of FIG. 6, in such an environment communication between the personal computer 100 and the smart card reader 110 is achieved via an air interface (e.g. a Bluetooth connection between short range communications subsystems 234 and 320). As the smart card reader driver 414 is located in the kernel space 238 and does not have access to Bluetooth drivers, messages are passed back into the user space 240 to the SCRS 610 and the available Bluetooth API 614 is used. Communication between the smart card reader driver 414 and the SCRS 610 is facilitated by a smart card reader service library 612. The smart card reader service library 612 includes a set of function calls that the SCRS 610 uses to communicate with the smart card reader driver 414.

The smart card reader environment 600 of FIG. 6 will now be further explained in the context of an example. A user who is currently using the desktop computer 100 may wish to login to the smart card 334, which has been connected to the storage component interface 332 of the smart card reader 110. The login attempt may involve use of the PC short range communications subsystem 232 (FIG.2) and the smart card reader short range communications subsystem 320 (FIG. 3) as the means of connectivity between the personal computer 100 and the smart card reader 110. In one example, a request may come from Microsoft® Outlook® (i.e., one of the smart card aware applications 416) as a result of the user wishing to insert a digital signature into an email. In the current example, Microsoft® Outlook® first sends a message to the Windows smart card service provider 418, where the message requests the login to the smart card 334.

Responsive to receiving the message, the smart card service provider 418 may create a command Application Protocol Data Unit (APDU) to be sent to the smart card 334. An APDU is a data structure for smart card systems. A standardized example is provided by the International Organization for Standardization (ISO) and is referred to as ISO 7816. The smart card service provider 418 then passes the newly created APDU to the Windows smart card resource manager 412, which passes the APDU across the I/O control interface 410 to the smart card reader driver 414.

Responsive to receiving the APDU, the smart card reader driver 414 passes the APDU to the smart card driver library 420. The smart card driver library 420 uses a callback function to pass the APDU back to the smart card reader driver 414. This callback function notifies the smart card reader driver 414 that the smart card reader driver 414 is to send the APDU to the smart card reader 110 and wait for a response from the smart card reader 110.

The smart card reader driver 414 then passes the APDU up to the SCRS 610 using commands and/or functions that are part of the smart card reader service library 612. The SCRS 610 sends the APDU to the smart card reader 110 over the Bluetooth connection using the Bluetooth API 614 (i.e., using the PC short range communications subsystem 232 shown in FIG. 2 and the smart card reader short range communications subsystem 320 shown in FIG. 3). The smart card reader 110 then processes the APDU and returns the appropriate response. This response from the smart card reader 110 follows the same path, in reverse fashion, back to Microsoft® Outlook® (or to another applicable smart card aware application 416).

As indicated above, the smart card reader service library 612 includes a set of function calls that the SCRS 610 uses to communicate with the smart card reader driver 414. The SCRS 610 also uses the smart card reader service library 612 to communicate with the smart card reader 110 in order to perform certain functions or routines provided in the smart card reader service library 612.

Figure 8:
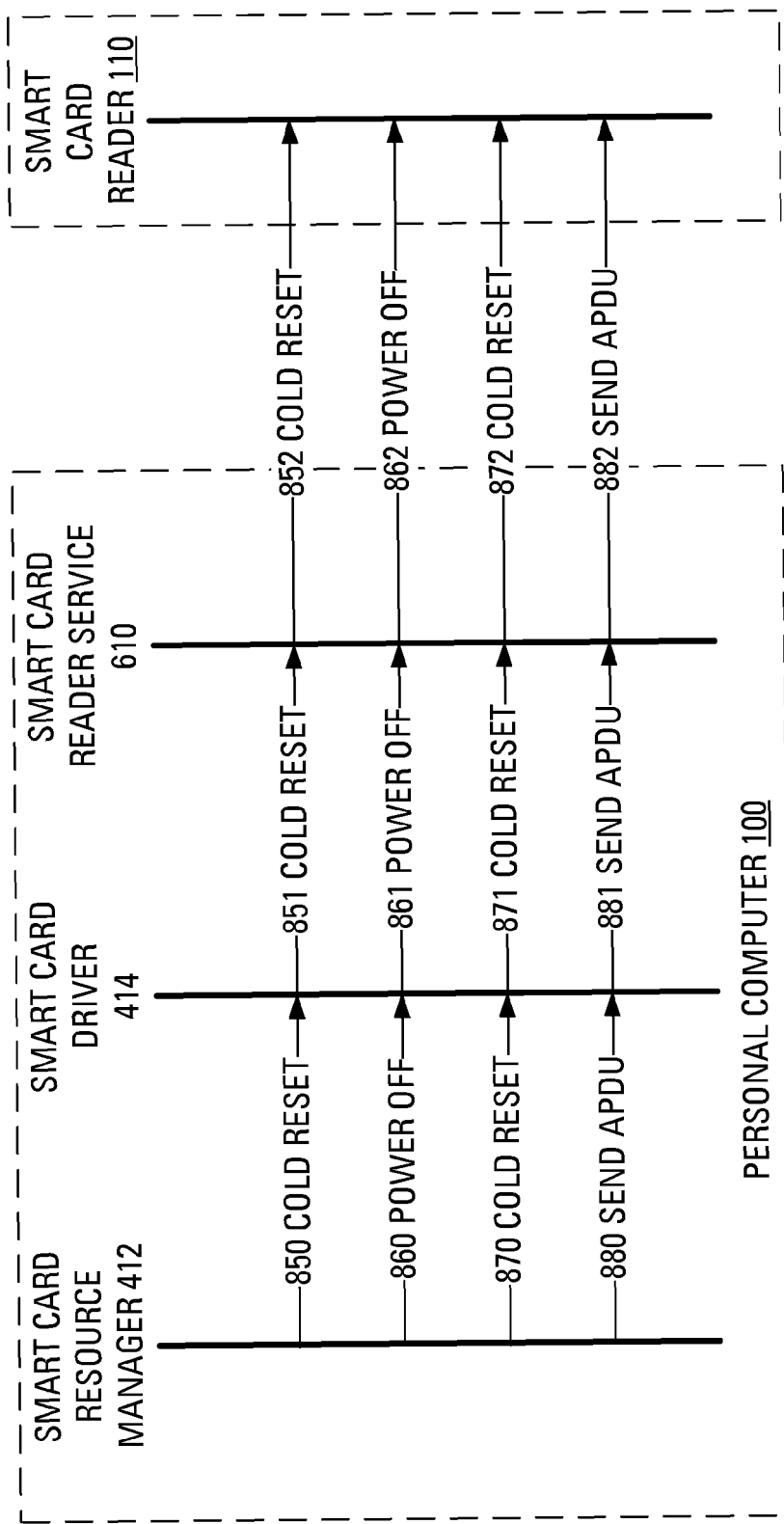
FIG. 8 shows an example conversation between a smart card resource manager, a vendor-supplied smart card reader driver, the smart card reader service and a smart card reader, for carrying out the method of FIG. 7.

Referring briefly to FIG. 8, there are a number of commands that may be sent from a smart card aware application 416 to a smart card reader 110 (e.g., via the path as described above in the context of FIG. 6). A "cold reset" command may, for example, be used to reset the smart card 334. The "cold reset" command may also be used at any time the smart card aware application 416 is to start a new or clean session with the smart card 334. For example, the "cold reset" command may be used when the computer 100 receives a message from the smart card reader 110 that the smart card 334 has just been inserted into the smart card reader 110, such that the smart card 334 is in a known (reset) state. In at least some example embodiments, the smart card 334 (and its associated reader 110) is in a known state when the smart card reader 110 is known to have recently come out of reset and no APDUs have been sent or received by the smart card reader 110 since it came out of reset. As indicated above, an APDU is a data structure for smart card systems, for example, as defined by ISO 7816. A send Application Protocol Data Unit ("Send APDU") command sends an APDU. A "power off" command disengages or turns off the smart card 334. In at least some example embodiments, the smart card reader 110 is used to provide user authentication information, digital certificate information and/or encryption key information to the personal computer 100.

Generally, example embodiments described herein are directed to reducing redundant or unnecessary commands being sent to the smart card reader 110. It is often the case that the manufacturer of a vendor-supplied smart card reader driver is different than at least one of the other applications (such as the operating system 326 and/or the smart card resource manager 412). Certain operational characteristics of a vendor-supplied smart card reader driver and an associated smart card reader service are thus described herein to facilitate such example embodiments.

Figure 7:
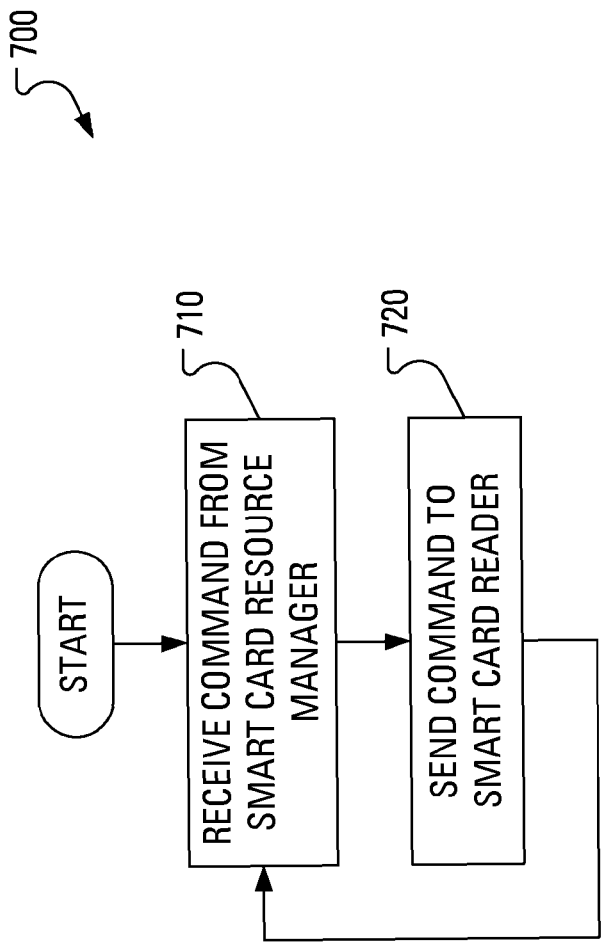
FIG. 7 shows a flow diagram of a conventional method carried out by a smart card reader service.

Reference is now made to FIGS. 7 and 8, which show examples of methods for sending commands to the smart card reader 110. FIG. 7 shows an example algorithm 700 as carried out by the SCRS 610, while FIG. 8 illustrates an example conversation among the smart card resource manager 412, the vendor-supplied smart card reader driver 414, the SCRS 610 and the smart card reader 110. Generally, in the examples of FIGS. 7 and 8, the SCRS 610 acts as a flow-through or relay for any instructions from the smart card resource manager 412. Thus, referring to FIG. 7, the SCRS 610 may perform the example algorithm 700, as shown. At first, the SCRS 610 receives (step 910), through the smart card reader driver 414, a command from the smart card resource manager 412. In response, the SCRS 610 sends (step 920) the command, through the Bluetooth API 614, in an appropriate command format that may be understood by the smart card reader 110, for processing by the smart card reader 110 and, subsequently, by the smart card 334.

Referring now to FIG. 8, an example of a message exchange among the smart card resource manager 412, the smart card reader driver 414, the SCRS 610 and the smart card reader 110 is illustrated. Passage of time is generally traversed from top to bottom of the conversation shown in FIG. 8. The illustrated conversation may, for example, start when the personal computer 100 receives a message from smart card reader 110 indicating that a smart card 334 has been inserted into the smart card reader 110. Note that the smart card reader 110 may, in some embodiments, be configured to send a smart card insertion notification message to the personal computer 100 even if the smart card 334 was not just inserted into the smart card reader 110. For example, in one embodiment, card insert/card removal messages are used, not only in the conventional sense (i.e., when a smart card has been physically inserted into or removed from the smart card reader 110), but also to share access to the smart card reader 110. For example, in an embodiment where the smart card reader can pair with or communicate with two different applications or devices (for example, a personal computer and a mobile communications device), the smart card reader 110 will send a card removal message to one application/device, which card removal message forces that application or device to stop sending messages to the smartcard reader 110. At the same time, the smart card reader 110 will send a card insert message to another application or device, thereby allowing the other application or device to send messages to the smart card reader 110.

When the personal computer 100 receives a smart card insertion notification message, the smart card resource manager 412 may send a number of commands intended to be processed by the smart card reader 110. As shown, the smart card resource manager 412 may send the commands of "cold reset" 850, "power off" 860, "cold reset" 870, "send APDU" 880, etc. In response, the smart card reader driver 414 will relay or send the command in the appropriate command format to the SCRS 610, as shown in corresponding commands of "cold reset" 851, "power off" 861, "cold reset" 871, "send APDU" 881, etc. The SCRS 610 will relay or send the command in the appropriate command format, through the Bluetooth API 614, to the smart card reader 110, as shown in corresponding commands of "cold reset" 852, "power off" 862, "cold reset" 872, "send APDU" 882, etc. Each step, notably the power off 860 and cold reset 870, takes time of up to at least a few seconds for the system to implement.

Inefficiencies may arise from the above method. For example, the first instance of cold reset 850 has caused the smart card 334 to be in a reset state. This reset state is known to the smart card resource manager 412. The subsequent steps of power off 860 and cold reset 870 may thus be redundant in view of the fact that the reset state is a known state, and as such may not be necessary to be sent to the smart card reader 110. It is also recognized herein that since no APDU is sent to the smart card reader 110 before the steps of power off 860 and cold reset 870, these steps are unnecessary as the smart card 334 would still be in the same known reset state.

Figure 9:
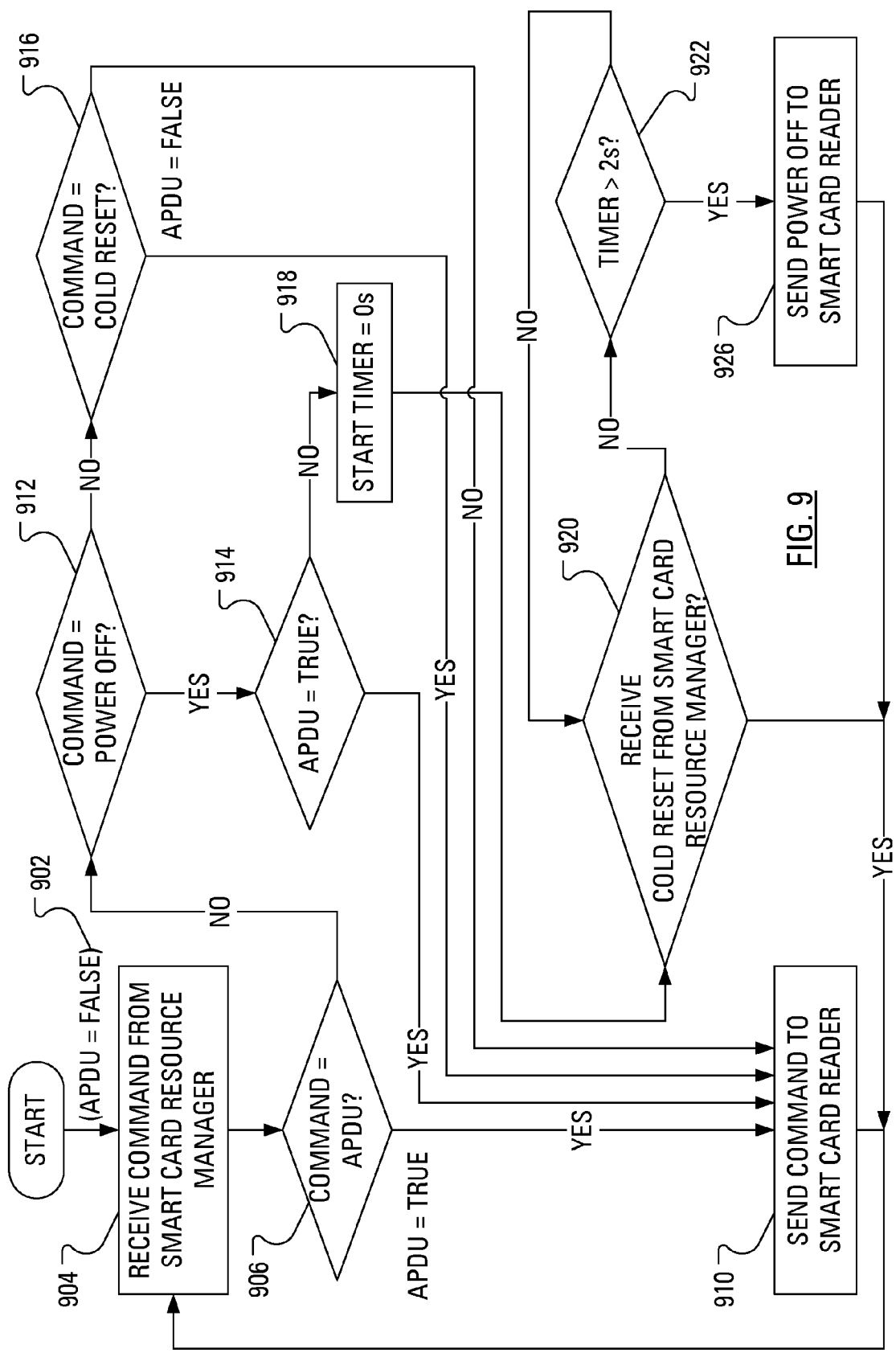
FIG. 9 shows a flow diagram of a method carried out by a smart card reader service in accordance with one embodiment.
Figure 10:
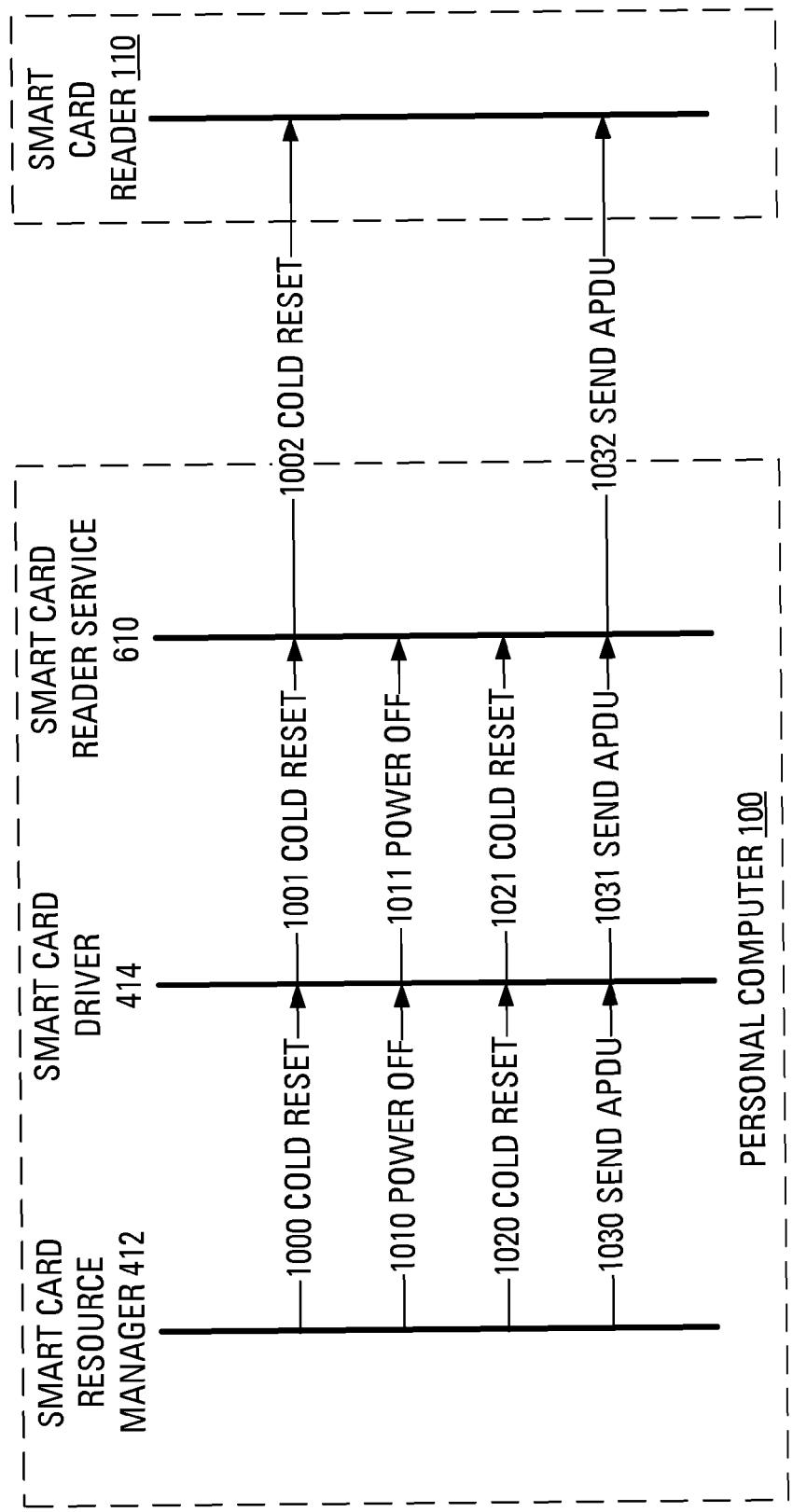
FIG. 10 shows an example conversation between a smart card resource manager, a vendor-supplied smart card reader driver, the smart card reader service and a smart card reader, for carrying out the method of FIG. 9 in accordance with one embodiment.

Accordingly, an example embodiment of an alternative method performed by the SCRS 610 will now be explained, with reference to FIGS. 9 and 10. The method shown in FIGS. 9 and 10 is similar to the method shown in FIGS. 6 and 7 subject to differences that will be apparent from the figures and the present description. FIG. 9 shows a flow diagram of the alternative method carried out by the SCRS 610, while FIG. 10 shows an example conversation using such alternative method as among the smart card resource manager 412, the smart card reader driver 414, the SCRS 610 and the smart card reader 110.

Referring now to FIG. 9, the SCRS 610 processes received commands (from the smart card reader driver 414) and determines whether certain commands should be sent to the smart card reader 110 and which commands should not be sent. Prior to the start of the algorithm illustrated in FIG. 9, it is assumed that the system is in a known state, for example, a reset state where no command APDUs have been received. Thus, initially, at step 902, a data indicator APDU may be set to FALSE. The data indicator APDU will be explained in further detail below. The SCRS 610 receives (step 904) a command (i.e., COMMAND) from the smart card resource manager 412. Note that although the present method re-uses COMMAND as a single variable throughout the algorithm illustrated in FIG. 9, it can be appreciated that any number of commands may be stored, queued, and/or processed as appropriate. The SCRS 610 then determines (step 906) whether the received COMMAND is an APDU. If so, the SCRS 610 sets the data indicator APDU to TRUE and sends the COMMAND to the smart card reader 110 (step 910). If, in step 906, the SCRS 610 has determined that the received COMMAND is not an APDU, the SCRS 610 then determines (step 912) whether the received COMMAND is "power off". If not, then the SCRS 610 then determines (step 916) whether the received COMMAND is a cold reset. If the COMMAND is a cold reset, then the SCRS 610 sets the data indicator APDU to FALSE and sends (step 910) the received COMMAND to the smart card reader 110.

Considering again step 912, if the SCRS 610 determines that the COMMAND is power off, then the SCRS 610 determines (step 914) whether the data indicator APDU is TRUE. If so, the SCRS 610 sends (step 910) the received COMMAND, through the Bluetooth API 614, to the smart card reader 110.

If the SCRS 610 determines (step 914) that the data indicator APDU is FALSE, the SCRS 610 proceeds to set (step 918) a TIMER to zero seconds. Generally, the TIMER may be used to determine whether a predetermined time has elapsed between a power off and a cold reset. In the example shown, the predetermined time is two seconds. The determination or selection of the predetermined time may, for example, be slightly greater than the time that it would normally take for the service to receive a cold reset command immediately after receiving a power off command. This would facilitate the situations where these two commands arrive sequentially in relatively quick succession, so that the SCRS 610 may optimize the discarding of both commands. Note that there is no strict upper bound on what is selected as the predetermined time. However, in the case where the smart card resource manager 412 is only sending a power off and has no intention of sending a cold reset, and if the predetermined time is too high, the smart card resource manager 412 will be unnecessarily preventing other devices from accessing the smart card for the duration of the predetermined time.

If an excessive or greater time than the predetermined time has elapsed, then the SCRS 610 sends (step 926) the power off command to the smart card reader 110 and the method proceeds to the initial step 904. A reason for this is that it is unlikely, after the predetermined time has elapsed, that the SCRS 610 will receive a "Cold Reset" command from the smart card resource manager 412. In this case, the smart card 334 should be powered down by way of the power off command. Subsequent to initializing the TIMER (step 918), the SCRS 610 polls within the predetermined time to determine (step 920) whether the cold reset command has been received. Responsive to determining that the cold reset command has not been received, the SCRS 610 determines (step 922) whether two seconds have elapsed. If so, then the SCRS 610 sends (step 926) the power off command to the smart card reader 110 and the method proceeds to the initial step 904. Responsive to determining that the cold reset command has been received within two seconds, the SCRS 610 returns to the initial step 904, i.e., the power off command and cold reset command are not sent to the smart card reader 110.

Referring now to FIG. 10, an example conversation using the above-described method may take place among the smart card resource manager 412, the smart card reader driver 414, the SCRS 610 and the smart card reader 110. Passage of time is generally traversed from top to bottom of the conversation shown in FIG. 10. Communications among the smart card resource manager 412, the vender supplied smart card driver 414 and the SCRS 610 occur within the personal computer 100 and communications between the SCRS 610 and the smart card reader 110 occur, in at least some example embodiments, over a wireless link such as a Bluetooth™ connection. Generally, the smart card resource manager 412 and the smart card reader driver 414 are sending the same commands to the SCRS 610 as in the example conversation of FIG. 8.

The illustrated conversation may, for example, start when the personal computer 100 receives a smart card insertion notification message from smart card reader 110 indicating that a smart card 334 has been inserted into the smart card reader 110. In an embodiment, the smart card reader 110 may be unaware of which commands the smart card resource manager 412 is sending to the smart card driver 414 and which commands received by the SCRS 610 from the smart card driver 414 are being filtered so as to not be sent to the smart card reader 110. As illustrated, the commands being sent are cold reset 1000, power off 1010, cold reset 1020 and send APDU 1030. As shown, the commands that are sent from the smart card driver 414 to the SCRS 610 are cold reset 1001, power off 1011, cold reset 1021 and send APDU 1031. Also shown are the commands that are sent from the SCRS 610 to the smart card reader 110, which commands are cold reset 1002 and send APDU 1032. The handling of each command by the SCRS 610 will now be explained with reference to the example method, steps of which are illustrated in FIG. 9.

Using the example method shown in FIG. 9, the cold reset 1001 command would be received as a COMMAND at step 904. At step 906, at the decision of whether COMMAND=APDU?, the answer would be NO, since cold reset is not an APDU, and the algorithm proceeds to step 912. At step 912, at the decision of whether COMMAND=power off, the answer would be NO, and the algorithm proceeds to step 916. At step 916, at the decision of whether COMMAND=cold reset, the answer would be YES, and the data indicator APDU would be set to FALSE. At step 910, the cold reset command would then be sent to the smart card reader 110, i.e., by sending cold reset 1002 (FIG. 10).

The power off 1011 command and cold reset 1021 command will now be explained with reference to FIG. 9. Using the algorithm shown in FIG. 9, the power off 1011 command would be received as COMMAND at step 904. At step 906, at the decision of whether COMMAND=APDU?, the answer would be NO, since power off is not an APDU, and the algorithm proceeds to step 912. At step 912, at the decision of whether COMMAND=power off, the answer would be YES, and the algorithm proceeds to step 914. At step 914, at the decision of whether APDU=TRUE, the answer would be NO (i.e., since no APDUs have been sent), and the algorithm proceeds to step 918. At step 918, a timer is reset to TIME=0s. At step 920 and 922, the algorithm waits for the predetermined time (e.g., two seconds) until a cold reset command is received. In the example conversation of FIG. 10, a cold reset 1021 has been received within the two seconds and the algorithm proceeds to the initial step 904, i.e., neither the power off command nor the cold reset command are sent to the smart card reader 110 (as shown in the gap in the conversation in FIG. 10). By filtering out the power off command 1011 and the cold reset command 1021, a time savings can be achieved in some configurations for the method of FIG. 9 relative to the method of FIG. 7.

Referring again to step 922 of FIG. 9, if no command is received within two seconds as determined by the timer that was reset at step 918, then, referring to step 926, a power off command would be sent to the smart card reader 110. In other words, it is as if the power off command was merely relayed through to the smart card reader 110 as in the typical or conventional case.

Continuing with the example, at step 904, a send APDU 1031 command may be received by the SCRS 610. At step 906, at the decision of whether COMMAND=APDU?, the answer would be YES, and the data indicator APDU is set to TRUE. The algorithm then proceeds to step 910. At step 910, the APDU command is then sent to the smart card reader 110, i.e., by send APDU 1032 (FIG. 10).

Accordingly, in some example embodiments, referring again to FIG. 9, in the described algorithm, if an APDU command was sent by the smart card resource manager 412 before the power off command, then data indicator APDU would be set to TRUE. In consequence, subsequent commands would be merely relayed through to the smart card reader 110. A reason for this feature is that most smart card resource managers 412 assume that after a cold reset, the smart card 334 will be in a fresh session state in which no APDUs have been received. The described algorithm assists in maintaining this assumption by permitting the power off and cold reset commands to go to the smart card reader 110 when an APDU has been previously sent.

It is understood that there may be additional steps in the above-described conversation shown in FIG. 10. For example, there are certain responses that are made by the smart card reader 110 back to the SCRS 610 and to the smart card resource manager 412, for example an answer to reset (ATR), which are not illustrated in order to simplify the workings of embodiments of the system.

In the example embodiment described above in respect of FIGS. 9 and 10, the power off command is sent to the smart card reader 110 if any APDU is send to the smart card reader 110 after the cold reset, and no distinction is made between APDUs that change the state of the smart card and APDUs that do not change the state of the smart card. Thus, in the embodiments of FIGS. 9 and 10, an assumption is made that all APDUs are potentially state altering, even though this may not reflect reality. One reason for making such an assumption is that some APDUs may be card dependent proprietary APDUs such that the SCRS 610 is unable to differentiate between state-altering and non-state-altering APDUs. In an alternative embodiment of the method shown in FIGS. 9 and 10, the response of the SCRS 610 can vary depending on the type of APDU command sent. For example, if APDU commands are received that would not alter the state of the smart card 334 from a known state (such as the reset state), then the SCRS 610 would refrain from sending the power off and reset commands to the smart card reader 110. In such an alternative embodiment, step 906 is modified to set APDU=TRUE only when (i) the received command is known to be a state-altering command (other than power off or cold rest); or (ii) the SCRS 610 does not know if the received command is a state-altering command or not. Information about the state-altering nature of various smart card commands can be stored, for example, in a look up table on the personal computer 100. Accordingly, in some example embodiments, the smart card 334 is in a known state when, subsequent to a reset command being sent to the smart card reader 110, no state-changing APDUs have been sent or received by the smart card 334.

Figure 11:
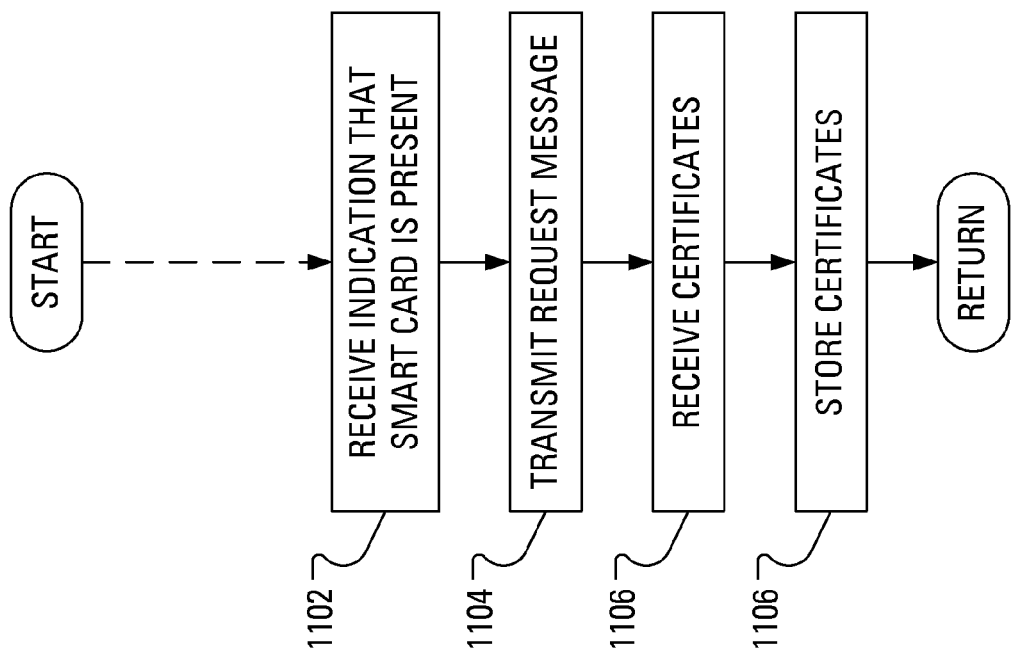
FIG. 11 shows a flow diagram of an example method executed by a smart card resource manager responsive to the establishment of a connection between the personal computing device shown in FIG. 2 and the smart card reader shown in FIG. 3.

When a Bluetooth™ connection between the personal computer 100 and the smart card reader 110 is initially established, a plurality of steps are carried out. Many of the plurality of steps relate to the establishment of the Bluetooth™ connection and, accordingly, are standard and will not be discussed here. However, some steps worth mentioning are presented in FIG. 11.

In particular, upon establishment of a connection, the smart card resource manager 412 may receive (step 1102) an indication that the smart card 334 is present in the smart card reader 110. Responsively, the smart card resource manager 412 may arrange the transmission (step 1104) of a request message to the smart card 334, where the request message specifically requests security certificates stored on the smart card 334. Where the smart card 334 responds with the certificates, the smart card resource manager 412 may receive (step 1106) the certificates and store (step 1108) the certificates.

Often it is the receipt, by the smart card resource manager 412, of the certificates from the smart card 334 that allows a user to unlock and use the personal computer 100.

Step 1106, the transfer of the certificates on the smart card 334 to the personal computer 100, is often of a particularly long duration.

When a user places the personal computer 100 in a sleep state or a hibernate state, a Bluetooth radio component of the short-range communication subsystem 232 is powered down. Accordingly, a previously established Bluetooth connection between the personal computer 100 and the smart card reader 110 is dropped. More particularly, a pairing between the smart card driver 414 and the smart card 334 is removed. The SCRS 610 reports to the smart card resource manager 412 that the status of the smart card 334 has changed from "present" to "absent". The removal of the pairing occurs since, without a Bluetooth connection between the personal computer 100 and the smart card reader 110, the SCRS 610 is unable to determine whether or not the smart card 334 is present in the smart card reader 110.

When operation of the personal computer 100 is restored from the sleep state or the hibernate state, a reconnect operation may be automatically initiated to reestablish a Bluetooth connection between the personal computer 100 and the smart card reader 110. Alternatively, the user of the personal computer 100 may manually initiate a reconnect operation to reestablish a Bluetooth connection between the personal computer 100 and the smart card reader 110. In either case, upon reestablishment of the Bluetooth connection, the smart card reader 110 indicates, to the SCRS 610, the presence of the smart card 334 in the smart card reader 110. Upon receipt (step 1102) of the indication, the smart card resource manager 412 arranges transmission (step 1104) of a request to the smart card reader 110 and, responsive to the requests receives (step 1106), and stores (step 1108), a copy of all of the certificates that are stored on the smart card 334.

The transfer of certificates that occurs responsive to the reestablishment of a wireless connection may be seen, by some, as unnecessary, since, when a wireless connection was originally established, the same information was transferred to the smart card resource manager 412.

It may be desirable to reduce the wait time before the personal computer 100 is unlocked and user-accessible after being restored from a sleep state or a hibernate state.

In accordance with various embodiments of the present disclosure, when the personal computer 100 is placed into sleep state, hibernate state or other, similar, standby state, the SCRS 610 does not report to the smart card resource manager 412 that there has been a change of state for the smart card 334, that is, the SCRS 610 does not report to the smart card resource manager 412 that the smart card 334 has been removed. When the personal computer 100 returns to an operational state, the SCRS 610 automatically reestablishes a connection to the smart card reader 110. From the perspective of the smart card resource manager 412, the smart card 334 was not removed. Accordingly, when the personal computer 100 is restored, the certificates are considered valid and the user may quickly access the personal computer 100.

Figure 12:
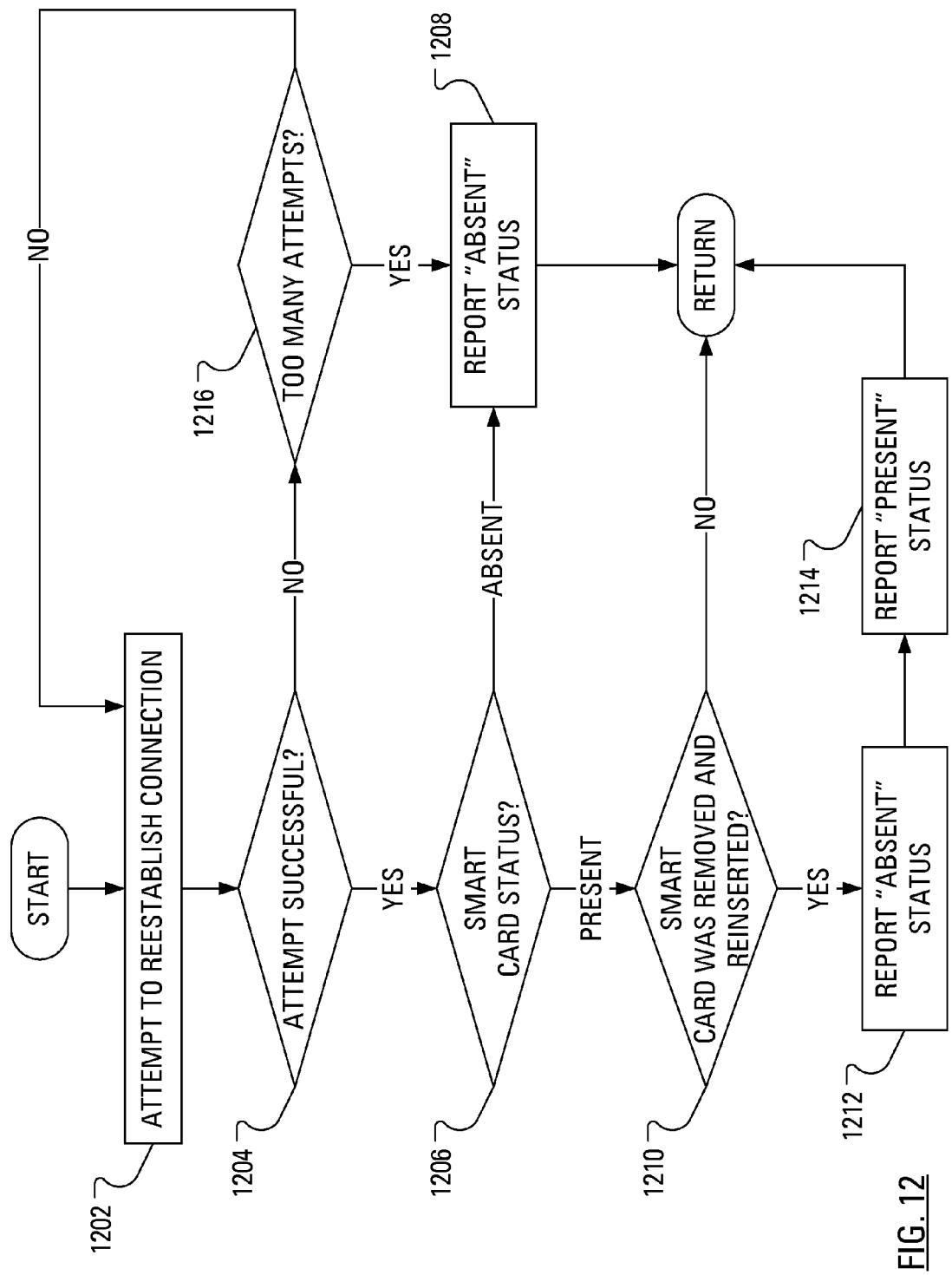
FIG. 12 shows a flow diagram of an example method executed by a smart card reader service after the loss of a connection between the personal computer and the smart card reader in accordance with one embodiment.

After the connection has been lost, and upon restoration of the operation of the personal computer 100 from a standby state, while the smart card resource manager 412 is unaware that the status of the smart card 334 has changed from "present" to "absent", the SCRS 610 is aware of the status change. Steps in an example method of determining the status of the smart card 334 from the perspective of the SCRS 610 are illustrated in FIG. 12. The SCRS 610 periodically attempts to re-establish the lost connection (step 1202). If the SCRS 610 determines (step 1204) that the attempt has been unsuccessful, another reattempt (step 1202) is performed a short time later. If the SCRS 610 determines (step 1204) that the attempt has been successful, the smart card driver determines (step 1206) whether the smart card 334 is present in the smart card reader 110.

If the SCRS 610 determines that the smart card 334 is no longer in the smart card reader 110, then the SCRS 610 transmits (step 1208), to the smart card resource manager 412, a status update so that the smart card resource manager 412 updates a status for the smart card 334 from "present" to "absent".

If the SCRS 610 determines that the smart card 334 is still (or back) in the smart card reader 110, the SCRS 610 determines (step 1210) whether the smart card 334 was removed from the smart card reader 110 during the time for which the connection was lost. If the SCRS 610 determines that the smart card 334 was maintained in the smart card reader 110 for the time during which there was no connection, then no further steps are taken, since the smart card resource manager 412 maintains a "present" status for the smart card 334. If the SCRS 610 determines that the smart card 334 was removed and re-inserted into the smart card reader 110 during the time during which there was no connection, then the security context/card state will not match the security context/card state maintained by the smart card resource manager 412.

Accordingly, the SCRS 610 transmits (step 1212), to the smart card resource manager 412, a status update so that the smart card resource manager 412 updates a status for the smart card 334 from "present" to "absent". The SCRS 610 then transmits (step 1214), to the smart card resource manager 412, a status update so that the smart card resource manager 412 updates a status for the smart card 334 from "absent" to "present".

There may be defined a maximum number of unsuccessful attempts to reestablish the Bluetooth connection. After each attempt (step 1202), if the attempt has been determined (step 1204) to have been unsuccessful, the SCRS 610 may determine (step 1216) whether the maximum number of unsuccessful attempts has been reached. If the maximum number has not been reached, another reestablishment is attempted (step 1202). However, if the maximum number has been reached, the SCRS 610 may transmit (step 1208), to the smart card resource manager 412, a status update so that the smart card resource manager 412 updates a status for the smart card 334 from "present" to "absent".

Beneficially, in the case where the attempted reconnection (step 1202) is successful and the smart card 334 is still present in the smart card reader 110, the user gains a large time savings since any need to re-import the certificates to the smart card resource manager 412 is obviated.

The smart card reader 110 may need to keep an active session open with the smart card 334, even after the smart card reader 110 loses its connection to the personal computer 100. This keeping an active session open is suggested to ensure that any security context the personal computer 100 has maintained with the smart card 334 is preserved when the personal computer 100 automatically reconnects, since the personal computer 100 will initially assume that the smart card 334 has not been powered down. The smart card reader 110 may keep track of the identity of the personal computer 100 for which the smart card reader 110 is holding the session open and, if the same personal computer 100 reconnects, then the smart card reader 110 may allow the personal computer 100 to continue holding that session.

FIG. 13 illustrates example steps in a method of operation for the smart card reader 110 including a reaction to a loss of connection with the personal computer 100. Upon recognizing (step 1302) a loss of a connection to the personal computer 100, the smart card reader 110 initializes (step 1303) a timer. Meanwhile, the smart card reader 110 maintains (step 1304) an open session with the smart card 334 and associates (step 1306) an identity of the personal computer 100 with the open session.

The smart card reader 110 may have a configurable timeout value, the magnitude of which is indicative of a duration the smart card reader 110 is to maintain an open session with the smart card 334 after recognizing a loss of connection to the personal computer 100. Keeping the smart card reader 110 powered on for long periods of time affects the battery life of the smart card reader 110. A user or administrator may be allowed to disable this feature of maintaining an open smart card session or control the duration of the timeout.

Accordingly, the smart card reader 110 determines (step 1307) whether the value to which the timer has counted exceeds the configurable timeout value. Once the smart card reader 110 has determined (step 1307) that the value to which the timer has counted exceeds the configurable timeout value, the smart card reader 110 closes (step 1314) the session with the smart card 334.

Some time later, while determining (step 1307) that the value to which the timer has counted has not exceeded the configurable timeout value, the smart card reader 110 establishes (step 1308) a connection with a computing apparatus. As it may not be immediately clear whether the connected computing apparatus is the personal computer 100, the smart card reader 110 compares (step 1310) the PC identity that is associated with the open session to the identity of the connected computing apparatus. Where the smart card reader 110 determines (step 1312) that the PC identity that is associated with the open session does not match the identity of the connected computing apparatus, the smart card reader 110 closes (step 1314) the session with the smart card 334. Where the smart card reader 110 determines (step 1312) that the PC identity that is associated with the open session matches the identity of the connected computing apparatus, the smart card reader 110 maintains (step 1316) the open session with the smart card 334.

Assuming that the smart card reader 110 keeps an active session open with the smart card 334 after the personal computer 100 disconnects and once the smart card reader 110 has allowed the personal computer 100 to continue using that session after the personal computer 100 reconnects, if a different user starts using the personal computer 100, the smart card reader 110 may automatically close the session with the smart card 334 so that the new user does not take advantage of the previous user's security context on the smart card 334.

Beneficially, in the case where the attempted reconnection (step 1202) is successful and the smart card 334 is still present in the smart card reader 110, the user gains a large time savings since any need to re-import the certificates to the smart card resource manager 412 is obviated.

A known Microsoft® Windows® Hardware Quality Laboratories (WHQL) driver test, passing of which is required to obtain a signed driver, requires that the smart card 334 be present in the smart card reader 110 before the personal computer 100 is placed in a stand-by mode and that the smart card 334 be present in the smart card reader 110 as soon as the personal computer 100 resumes operation. Obtaining a signed driver can be seen as providing a competitive advantage by many hardware manufacturers. Since, typically, the Bluetooth connection is dropped and the status of the smart card 334 is set to "absent" when the personal computer 100 goes into a stand-by mode, upon restoration of operation of the personal computer 100, the status of the smart card 334 remains set to "absent". Accordingly, the WHQL driver test is failed and a signature for the driver may not be attained.

The above-described method, wherein the SCRS 610 purposefully neglects to inform the smart card resource manager 412 of the change of status of the smart card 334, allows the SCRS 610 to pass the WHQL driver test.

In another scenario, if the user walks away from the personal computer 100 carrying or attached to, the smart card reader 110 and a problem similar to the above problem presents itself. Once enough distance is placed between the Bluetooth radio in the smart card reader 110 and the Bluetooth radio in the short-range communications subsystem 232 of the personal computer 100, a previously established Bluetooth connection is dropped. Consequently, the SCRS 610 transmits a status update to the smart card resource manager 412 indicating that the status of the smart card 334 has changed to "absent". Some time later, when the user returns to a proximity to the personal computer 100 that allows for an automatic or manual reestablishment of the Bluetooth connection between the personal computer 100 and the smart card reader 110, the user is required to wait until the certificates can be copied from the smart card 334 to the smart card resource manager 412, before the user is permitted to access the personal computer 100.

It may be desirable to reduce the wait time before the personal computer 100 is unlocked and user-accessible after restoration of a dropped Bluetooth connection to the smart card reader 110.

In accordance with various embodiments of the present disclosure, when a Bluetooth connection between the smart card reader 100 and the personal computer 100 is dropped because the smart card reader 334 has been moved out of Bluetooth range from the personal computer 100, the SCRS 610 does not report to the smart card resource manager 412 that there has been a change of state for the smart card 334, that is, the SCRS 610 does not report to the smart card resource manager 412 that the smart card 334 has been removed. When the smart card reader 110 returns to within Bluetooth range of the personal computer 100, the SCRS 610 automatically reestablishes a connection to the smart card reader 110. From the perspective of the smart card resource manager 412, the smart card 334 was not removed. Accordingly, the certificates are considered valid and the user may continue to access the personal computer 100.

As will be apparent to a person of ordinary skill in the art, while the smart card reader 110, with the smart card 334 installed therein, is out of range of the personal computer 100, the smart card resource manager 412, which is unaware that the smart card 334 is out of range, may attempt to communicate with the smart card 334. In such a case, the SCRS 610 may transmit a report to the smart card resource manager 412 indicating a failure to communicate with the smart card 334. Such failure report messages are generally standardized and may include an error code indicating, for instance, a "no media exception" or a "timeout".

Some smart card aware personal computers have a feature wherein a user interface on the personal computer may be locked when smart card removal is sensed. For such a feature to continue to operate normally, the present method may be disabled. That is, if the user expects the personal computer 100 to lock when the smart card reader 110 is out of Bluetooth range, it is important that the SCRS 610 properly indicate the status of the smart card 334.

Although the memory card 334 is described as being received by the smart card reader 110 in the preceding examples, it will be understood by a person of ordinary skill in the art that there exist "contactless" smart cards whose communication with the smart card reader 110 does not depend on physical contact. Instead, such smart cards communicate wirelessly with the smart card reader 110.

The above-described embodiments of the present application are intended to be examples only. Alterations, modifications and variations may be effected to the particular embodiments by those skilled in the art without departing from the scope of the application.

What is claimed is:

1. A method of facilitating communications between a computing device and a smart card reader, said smart card reader configured for communication with a smart card, said method comprising:
   recognizing, during an active session with said smart card, a loss of a connection between said smart card reader and said computing device; and
   subsequent to said loss, refraining from closing said active session with said smart card, thereby maintaining an open session with said smart card, and associating an identity of said computing device with said open session.

2. The method of claim 1 wherein said connection between said smart card reader and said computing device comprises a wireless connection.

3. The method of claim 2 wherein said wireless connection employs a Bluetooth communication protocol.

4. The method of claim 1 wherein said connection between said smart card reader and said computing device comprises a wired connection.

5. The method of claim 1, further comprising:
   initializing a timer subsequent to said loss,
   wherein said timer is associated with a configurable timeout value indicating a duration for which said smart card reader maintains said open session with said smart card.

6. The method of claim 5 wherein said timeout value is disabled.

7. The method of claim 5 wherein when said timer has exceeded said timeout value, said smart card reader closes said open session with said smart card.

8. A computing device comprising a processor adapted to execute a smart card reader service to:
   recognize, during an active session with a smart card, a loss of a connection between a smart card reader configured for communication with said smart card, and said computing device; and
   subsequent to said loss, refrain from closing an active session with said smart card, thereby maintaining an open session with said smart card, and associate an identity of said computing apparatus with said open session.

9. The computing device of claim 8 wherein said connection between said smart card reader and said computing device comprises a wireless connection.

10. The computing device of claim 9 wherein said wireless connection employs a Bluetooth communication protocol.

11. The computing device of claim 8 wherein said connection between said smart card reader and said computing device comprises a wired connection.

12. The computing device of claim 8 wherein said processor is further adapted to execute said smart card reader service to initialize a timer subsequent so said loss, wherein said timer is associated with a configurable timeout value indicating a duration for which said smart card reader maintains said open session with said smart card.

13. The computing device of claim 12 wherein said timeout value is disabled.

14. The computing device of claim 13 wherein when said timer has exceeded said timeout value, said smart card reader closes said open session with said smart card.

15. A computer readable medium containing computer-executable instructions that, when performed by a processor of a computing device, cause said processor to:
   recognize, during an active session with a smart card, a loss of a connection between a smart card reader configured for communication with said smart card, and said computing apparatus; and
   subsequent to said loss, refrain from closing said active session with said smart card, thereby maintaining an open session with said smart card, and associate an identity of said computing device with said open session.

16. The computer readable medium of claim 15 wherein said connection between said smart card reader and said computing device comprises a wireless connection.

17. The computer readable medium of claim 16 wherein said wireless connection employs a Bluetooth communication protocol.

18. The computer readable medium of claim 15 wherein said connection between said smart card reader and said computing device comprises a wired connection.

19. The computer readable medium of claim 15 wherein said computer-executable instructions, when performed by said processor, further cause said processor to initialize a timer subsequent to said loss, wherein said timer is associated with a configurable timeout value indicating a duration for which said smart card reader maintains said open session with said smart card.

20. The computer readable medium of claim 19 wherein said timeout value is disabled.

21. The computer readable medium of claim 19 wherein when said timer has exceeded said timeout value, said smart card reader closes said open session with said smart card.

* * * * *

UNITED STATES PATENT AND TRADEMARK OFFICE
CERTIFICATE OF CORRECTION

PATENT NO. : 8,496,175 B2
APPLICATION NO. : 13/617363
DATED : July 30, 2013
INVENTOR(S) : Dinah Lea Marie Davis et al.

Page 1 of 1

It is certified that error appears in the above-identified patent and that said Letters Patent is hereby corrected as shown below:

In the Claims:
Col. 20, line 20, line 3 of claim 12 should read "to initialize a timer subsequent to said loss, wherein said"

Signed and Sealed this
Seventeenth Day of December, 2013

Margaret A. Focarino
*Commissioner for Patents of the United States Patent and Trademark Office*